UNITED STATES PATENT OFFICE.

FRITZ W. JUST, OF MINNEAPOLIS, MINNESOTA, ASSIGNOR TO MINNEAPOLIS BREWING COMPANY, OF MINNEAPOLIS, MINNESOTA, A CORPORATION OF MINNESOTA.

NON-ALCOHOLIC AND NON-MALT BEVERAGE AND PROCESS OF MAKING THE SAME.

1,181,770.  Specification of Letters Patent.  Patented May 2, 1916.

No Drawing.  Application filed September 24, 1915.  Serial No. 52,364.

*To all whom it may concern:*

Be it known that I, FRITZ W. JUST, a citizen of the United States, resident of Minneapolis, county of Hennepin, and State of Minnesota, have invented a new and useful Non-Alcoholic and Non-Malt Beverage and Process of Making the Same, of which the following is a specification.

This invention relates to non-alcoholic and non-malt beverages and process of making the same, and the object of the invention is to provide a beverage of this class having the appearance and general taste of lager beer.

The invention consists generally in the process hereinafter described and in the beverage produced by said process.

In carrying out my invention I provide about 430 barrels of water, to which I add about 80 pounds of common salt, and thoroughly boil the same. I add brewing sugar to give the liquid a specific gravity of 1.0232 equal to about 5.8% extract. For the amount of water stated about 5500 pounds of brewing sugar will be required. I then add hops, in the proportion of about 0.6 pounds per barrel, for the purpose of producing the bitter hop aroma, and I add about 8 gallons of sugar coloring material to give the liquid the desired color resembling beer. I then boil this mixture for a period of about two and one-half hours, adding about 10 pounds of a suitable foam retainer such as gum tragacanth. The resulting liquid is run through a strainer to remove spent hops. The whole brew is then cooled to a low temperature, about 6 degrees Réaumur, and is divided into two parts, which will usually be in substantially the proportion of one-third and two-thirds, which are run into separate tanks. To the mixture contained in each tank a suitable acid, in the proportion of about 2½% of the mixture in the tank, is added. I have used either lactic acid or tartaric acid with equally good results, and I consider that said acids are equivalents one for the other in carrying out this process. To the tank containing the larger quantity of the mixture yeast is added in proportion of about 0.3 pounds of yeast to each barrel of the liquid. By lowering the temperature to about freezing point the fermentation is checked as soon as the yeast starts to work. The contents of the two tanks are then run together through filters into a third tank thereby completely mixing the same. The whole mixture is then carbonated and again filtered and the beverage is ready for the market. It may be bottled or put up in kegs of ordinary form.

I claim as my invention:

1. The process of producing a non-alcoholic and non-malt beverage consisting in mixing water and common salt, adding brewing sugar until the liquid has a specific gravity of about 1.0232 adding hops, and a sugar coloring material, boiling the mixture, adding a foam retainer, removing the spent hops, cooling the liquid to a low temperature, adding tartaric or equivalent acid, running the liquid into separate tanks, adding yeast to the liquid contained in one tank, mixing the liquid in the two tanks, and carbonating the same, substantially as described.

2. The herein described non-alcoholic and non-malt beverage, comprising water, common salt, brewing sugar, hops, sugar coloring material, a foam retainer, tartaric or equivalent acid, yeast, and carbonic acid gas, all in the proportion substantially as herein set forth.

In witness whereof, I have hereunto set my hand this 14th day of September, 1915.

FRITZ W. JUST.